(12) United States Patent
Gosal (10) Patent No.: US 11,490,151 B1
(45) Date of Patent: Nov. 1, 2022

(54) AMBIENT LIGHT SENSOR BASED PICTURE ENHANCEMENT

(71) Applicant: Roku, Inc., San Jose, CA (US)

(72) Inventor: Sukhdeep S. Gosal, Union City, CA (US)

(73) Assignee: ROKU, INC., San Jose, CA (US)

(*) Notice: Subject to any disclaimer, the term of this patent is extended or adjusted under 35 U.S.C. 154(b) by 0 days.

(21) Appl. No.: 17/382,683

(22) Filed: Jul. 22, 2021

(51) Int. Cl.
*H04N 5/58* (2006.01)
*H04N 21/422* (2011.01)
*H04N 21/4402* (2011.01)

(52) U.S. Cl.
CPC ......... *H04N 21/42202* (2013.01); *H04N 5/58* (2013.01); *H04N 21/4402* (2013.01)

(58) Field of Classification Search
None
See application file for complete search history.

(56) References Cited

U.S. PATENT DOCUMENTS

| | | | | |
|---|---|---|---|---|
| 6,791,566 | B1* | 9/2004 | Kuratomi | G02B 6/0043 |
| | | | | 345/589 |
| 9,432,612 | B2* | 8/2016 | Bruhn | G09G 5/00 |
| 2005/0062888 | A1 | 3/2005 | Wood et al. | |
| 2006/0038807 | A1* | 2/2006 | Eckhardt | H04N 1/407 |
| | | | | 345/207 |
| 2007/0046908 | A1* | 3/2007 | Choi | H04N 5/58 |
| | | | | 353/121 |
| 2011/0134091 | A1* | 6/2011 | Chen | G09G 3/3406 |
| | | | | 345/207 |
| 2012/0075353 | A1* | 3/2012 | Dong | H04N 9/3155 |
| | | | | 382/168 |
| 2015/0089551 | A1* | 3/2015 | Bruhn | H04N 5/58 |
| | | | | 725/80 |
| 2016/0277244 | A1* | 9/2016 | Reichert, Jr. | H04N 21/42203 |
| 2016/0366444 | A1* | 12/2016 | Sullivan | H04N 19/70 |
| 2020/0169687 | A1* | 5/2020 | Peng | H04N 7/01 |

FOREIGN PATENT DOCUMENTS

DE 19721984 A1 * 12/1998 ............... H04N 5/58

* cited by examiner

*Primary Examiner* — William J Kim
(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments, and/or combinations and sub-combinations thereof, for adjusting an output of a media device to a display device based on measurement data from the ambient light source. According to some embodiments, a computer implemented method for adjusting one or more parameters of a content to be displayed on a display device can include receiving, by a media device and from an electronic device, measurement data including ambient light measurement data for an environment of the media device, the electronic device, and the display device. The method can further include adjusting, at the media device, the one or more parameters of the content based at least on the measurement data and outputting, by the media device, the adjusted content to the display device to be displayed.

20 Claims, 6 Drawing Sheets

AMBIENT LIGHT SENSOR BASED PICTURE ENHANCEMENT

BACKGROUND

Field

This disclosure is generally directed to picture enhancement using an ambient light sensor, and more particularly to embodiments for adjusting an output of a media device to a display device based on measurement data from the ambient light source.

Background

A smart phone can include an ambient light sensor to adjust the backlight of the phone's display. For example, in a dark room, the backlight of the phone's display can be automatically reduced to provide a more visible display. Similarly, in a bright room, the backlight of the phone's display can be automatically increased to provide a more visible display.

A media device (e.g., a streaming media device) can be coupled to a display device (e.g., a television (TV)) to provide content (e.g., video) to the display device to be displayed to a user. The viewing quality of the content on the display device can depend on environment conditions such as ambient light in the environment where the display device is located.

SUMMARY

Provided herein are system, apparatus, article of manufacture, method and/or computer program product embodiments, and/or combinations and sub-combinations thereof, for adjusting an output of a media device to a display device based on measurement data from an ambient light sensor. The media device can adjust one or more parameters of the content that the media device outputs to the display device. The media device can adjust the parameters based on measurement data from one or more electronic devices couples to the media device. Therefore, the media device can efficiently adjust its output data to enhance the viewing quality of the content on the display device According to some embodiments, a computer implemented method for adjusting one or more parameters of a content to be displayed on a display device can include receiving, by a media device and from an electronic device, measurement data including ambient light measurement data for an environment of the media device, the electronic device, and the display device. The method can further include adjusting, at the media device, the parameters of the content based at least on the measurement data and outputting, by the media device, the adjusted content to the display device to be displayed.

In some embodiments, the content can include video data and the one or more parameters of the content can include a luminance associated with the video data. In some embodiments, the adjusting can include determining, at the media device, a first value of the luminance associated with the video data and determining, at the media device, a second value for the luminance based on the ambient light measurement data. The adjusting can further include comparing, at the media device, the first value to the second value and adjusting, at the media device, the luminance associated with the video data to the second value in response to a difference between the first value and the second value satisfying a condition. In some embodiments, the second value for the luminance can be stored in a table indicating correlations between values of the luminance and values of the ambient light measurement data.

In some embodiments, the method can further include determining, at the media device, that the one or more parameters of the content are to be adjusted and transmitting, by the media device and to the electronic device, a request for the measurement data. In some embodiments, determining that the one or more parameters of the content are to be adjusted can include periodically analyzing, at the media device, the content received at the media device. Additionally, or alternatively, determining that the one or more parameters of the content are to be adjusted can include receiving, at the media device and from the electronic device, a second request to adjust the one or more parameters of the content.

In some embodiments, the measurement data can further include one or more characteristics of the electronic device. Additionally, or alternatively, the measurement data can further include one or more characteristics of the environment of the media device, the electronic device, and the display device.

According to some embodiments, a non-transitory computer-readable medium of a media device can have instructions stored thereon that, when executed by at least one computing device, cause the at least one computing device to perform operations for adjusting one or more parameters of a content to be displayed on a display device. The operations can include determining that the one or more parameters of the content are to be adjusted and transmitting, to an electronic device, a request for measurement data. The operations can further include receiving, from the electronic device, the measurement data comprising ambient light measurement data for an environment of the media device, the electronic device, and the display device. The operations can also include adjusting the one or more parameters of the content based at least on the measurement data and outputting the adjusted content to the display device to be displayed.

According to some embodiments, a media device can include a transceiver configured to communicate over a wireless network and a controller coupled to the transceiver. The controller can be configured to receive, using the transceiver and from an electronic device, measurement data. The measurement data can include ambient light measurement data for an environment of the media device, the electronic device, and a display device. The controller can further be configured to adjust the one or more parameters of a content based at least on the measurement data. The content can include video data and the one or more parameters of the content can include a luminance associated with the video data. The controller can further be configured to output the adjusted content to the display device to be displayed.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for adjusting an output of a media device to a display device based on measurement data from the ambient light source.

Figure 1:
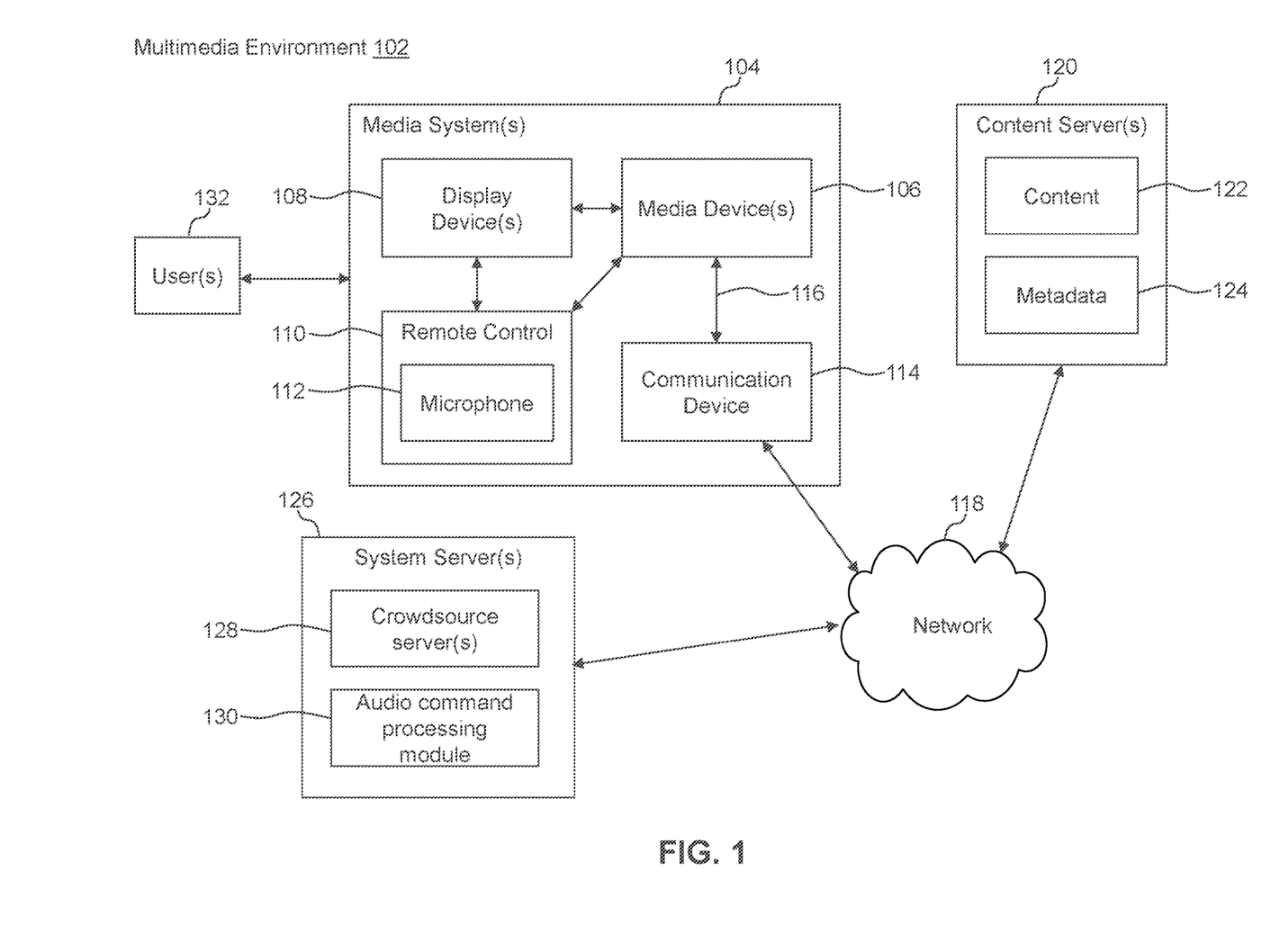
FIG. 1 illustrates a block diagram of a multimedia environment, according to some embodiments.

Various embodiments of this disclosure may be implemented using and/or may be part of a multimedia environment 102 shown in FIG. 1. For example, multimedia environment 102 can support adjusting an output of a media device to a display device based on measurement data from the ambient light source. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. For example, media environment 300 of FIG. 3 can implement various embodiments of this disclosure. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, a gaming device, and/or digital video recording device, to name just a few examples. Display device 108 may be a monitor, television (TV), computer, smart phone, tablet, wearable (such as a watch or glasses), appliance, Internet-of-Things (IoT) device, and/or projector, to name just a few examples. In some embodiments, media device 106 can be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (for example, a wireless local area network (WLAN) such as WiFi) and/or wired connections.

In various embodiments, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smart phone, wearable, on-screen controls, integrated control buttons, audio controls, or any combination thereof, to name just a few examples. In an embodiment, the remote control 110 wirelessly communicates with the media device 106 and/or display device 108 using cellular, Bluetooth, infrared, etc., or any combination thereof. The remote control 110 may include a microphone 112, which is further described below.

The multimedia environment 102 may include a plurality of content servers 120 (also called content providers or sources 120). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 includes data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

The media devices 106 may exist in thousands or millions of media systems 104. Accordingly, the media devices 106 may lend themselves to crowdsourcing embodiments and, thus, the system servers 126 may include one or more crowdsource servers 128.

For example, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streamings of the movie.

The system servers 126 may also include an audio command processing module 130. As noted above, the remote control 110 may include a microphone 112. The microphone 112 may receive audio data from users 132 (as well as other sources, such as the display device 108). In some embodiments, the media device 106 may be audio responsive, and the audio data may represent verbal commands from the user 132 to control the media device 106 as well as other components in the media system 104, such as the display device 108.

In some embodiments, the audio data received by the microphone 112 in the remote control 110 is transferred to the media device 106, which is then forwarded to the audio command processing module 130 in the system servers 126. The audio command processing module 130 may operate to process and analyze the received audio data to recognize the user 132's verbal command. The audio command processing module 130 may then forward the verbal command back to the media device 106 for processing.

Figure 2:
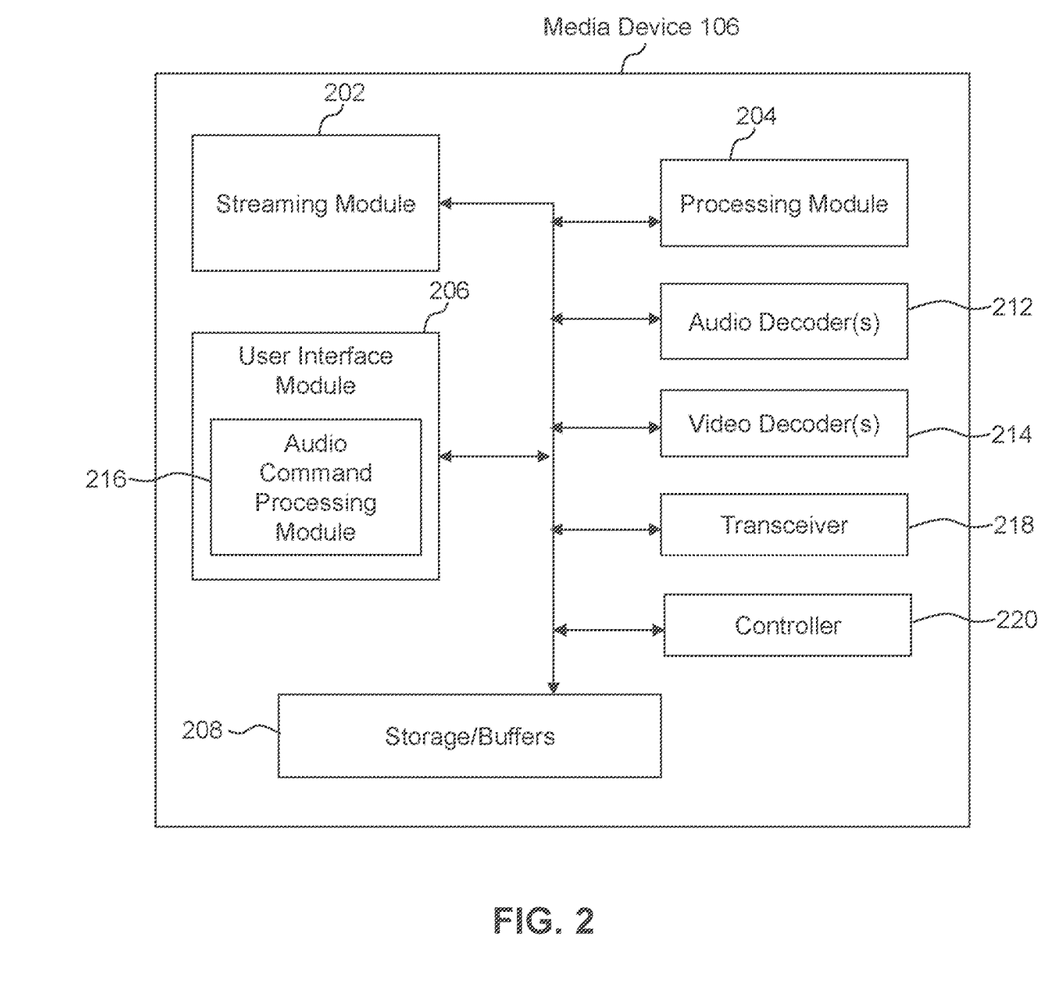
FIG. 2 illustrates a block diagram of a streaming media device, according to some embodiments.

In some embodiments, the audio data may be alternatively or additionally processed and analyzed by an audio command processing module 216 in the media device 106 (see FIG. 2). The media device 106 and the system servers 126 may then cooperate to pick one of the verbal commands to process (either the verbal command recognized by the audio command processing module 130 in the system servers 126, or the verbal command recognized by the audio command processing module 216 in the media device 106).

FIG. 2 illustrates a block diagram of an example media device 106, according to some embodiments. Media device 106 may include a streaming module 202, processing module 204, storage/buffers 208, and user interface module 206. As described above, the user interface module 206 may include the audio command processing module 216.

The media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OPla, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 132.

In streaming embodiments, the streaming module 202 may transmit the content to the display device 108 in real time or near real time as it receives such content from the content server(s) 120. In non-streaming embodiments, the media device 106 may store the content received from content server(s) 120 in storage/buffers 208 for later playback on display device 108.

Media device 106 can include controller 220 configured to transmit content to display device 108. For example, controller 220 can be configured to receive the content from streaming module 202, analyze and process the content, and output the content to display device 108. Additionally, or alternatively, controller 220 can be configured to retrieve the content from storage/buffers 208, analyze and process the content, and output the content to display device 108. It is noted that the structural and functional aspects of controller 220 may wholly or partially exist in the same or different ones of streaming module 202, processing module 204, audio decoder(s) 212, and/or video decoder(s) 214.

As discussed in more detail below, controller 220 can be configured to receive measurement data from one or more other devices and use the measurement data to process and adjust the content that controller 220 outputs to display device 108. According to some embodiments, media device 106 can include one or more transceivers 218 configured to receive the measurement data from the one or more other devices.

Transceiver 218 can include processors, controllers, radios, sockets, plugs, buffers, and like circuits/devices used for connecting to and communicating on networks. In some examples, the transceivers 218 can include one or more of a cellular subsystem, a WLAN subsystem, a Bluetooth™ subsystem, a near-field communication (NFC), or the like. A given transceiver 218 can include one or more circuits to enable connection(s) and communication based on, for example, Bluetooth™ protocol (or similar protocols). Additionally, or alternatively, transceiver 218 can include one or more circuits to enable connection(s) and communication over WLAN networks such as, but not limited to, networks based on standards described in IEEE 802.11. For example, transceiver 218 can include one or more circuits to enable communication over mesh networks. Transceiver 218 enables media device 106 to communicate with one or more user devices such as, but not limited to, a remote control, a tablet, a laptop computer, a smart phone, a wearable device, on-screen controls, integrated control buttons, audio controls, or any combination thereof, to name just a few examples.

Media Environment

Figure 3:
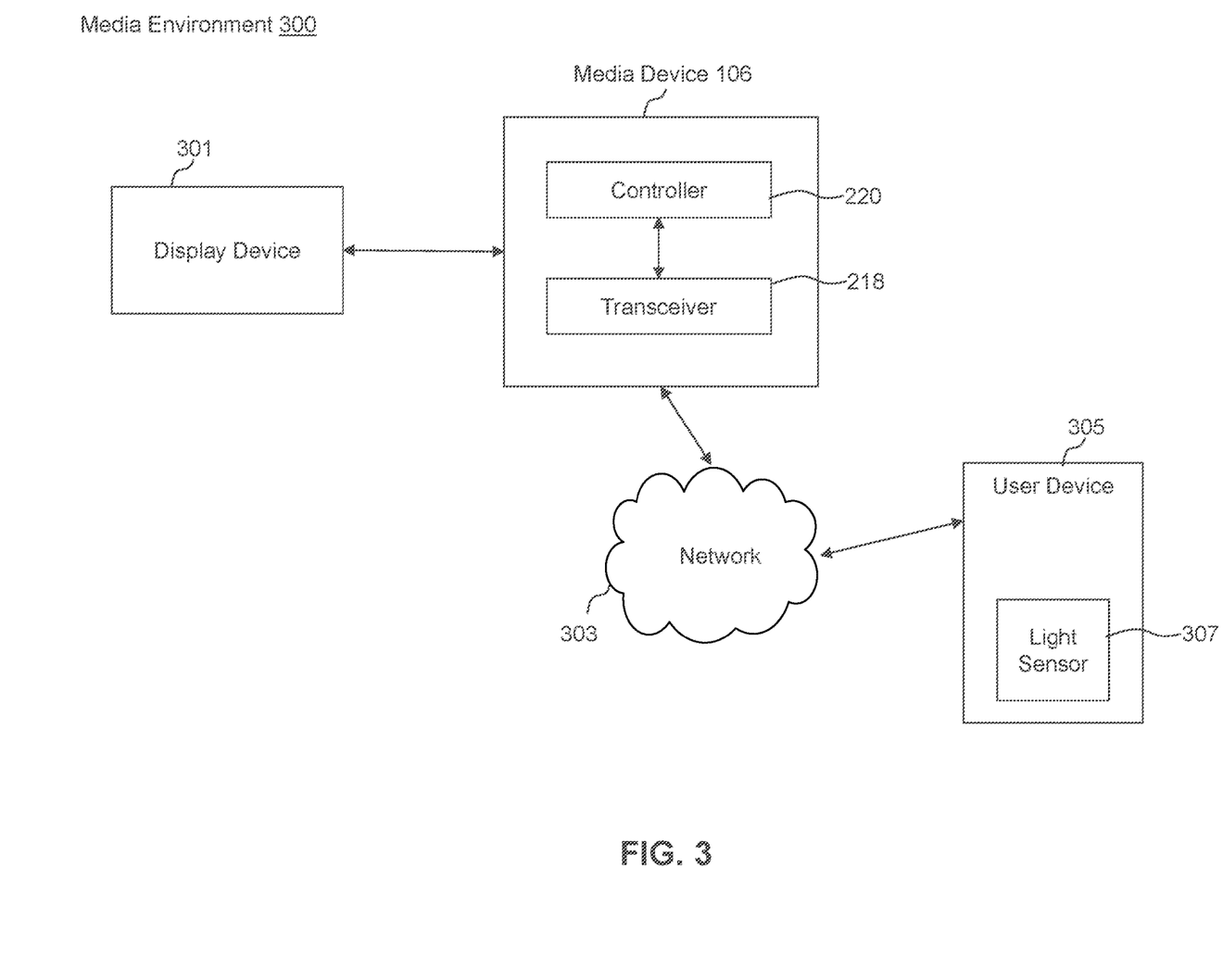
FIG. 3 illustrates a block diagram of a media environment, according to some embodiments.

FIG. 3 illustrates a block diagram of a media environment 300, according to some embodiments. Media environment 300 can include one or more media devices 106, one or more display devices 301, one or more networks 303, and one or more user devices 305. According to some embodiments, media environment 300 can be implemented with multimedia environment 102 of FIG. 1. For example, display device 301 can be (or include or be part of) display device 108 of FIG. 1 and network 303 can be (or include or be part of) network 118 of FIG. 1. Although FIG. 3 illustrates one display device, one media device, and one user device, media environment 300 of this disclosure can include any number of display devices, media devices, and user devices.

User device 305 can be an electronic device such as, but not limited to, a remote control, a tablet, a laptop computer, a smart phone, a personal digital assistant (PDA), desktop workstation, netbook, tablet, or any combination thereof, to name just a few examples. Some examples of this disclosure are discussed with respect to a smart phone or a remote control as user device 305. However, the embodiments of this disclosure are not limited to these examples and user device 305 can include other electronic devices configured to measure ambient light (or other characteristics) of media environment 300 and can be configured to communicate measurement data to media device 106.

According to some embodiments, and as discussed above with respect to FIGS. 1 and 2, media device 106 can be configured to provide content to display device 301 to be displayed to a user (e.g., user 132 of FIG. 1). Display device 301 may be a monitor, a TV, a computer, a smart phone, a tablet, a wearable device (such as a watch or glasses), an appliance, an IoT device, a projector, or the like. In some embodiments, media device 106 can be a part of, integrated with, operatively coupled to, and/or connected to its respective display device 301. The content provided by media device 106 to display device 301 can include, but is not limited to any combination of music, videos, movies, TV programs, multimedia, images, still pictures, text, graphics, gaming applications, advertisements, programming content, public service content, government content, local community content, software, and/or any other content or data objects in an electronic form.

According to some embodiments, media device 106 can adjust the brightness and/or the contrast of the content that media device 106 provides to display device 301. Media device 106 can be configured to adjust the brightness and/or the contrast of the content based one or more characteristics of media environment 300. According to some embodiments, the one or more characteristics of media environment 300 can include, but are not limited to, ambient light, time of day, date, weather characteristics associated with media environment 300, sunrise/sunset information associated with media environment 300, characteristics/settings of electronic devices in media environment 300, location information of electronic devices in media environment 300, and the like.

According to some embodiments, and as discussed in more detail below, user device 305 can be configured to measure the one or more characteristics of media environment 300. User device 305 can generate measurement data (based on the one or more characteristics of media environment 300). User device 305 can be configured to communicate the measurement device to media device 106. In some examples, user device 305 can communicate the measurement device to media device 106 through network 303. Media device 106 can use the measurement data to adjust the brightness and/or the contrast of the content that media device 106 provides to display device 301.

According to some embodiments, media device 106, display device 301, and user device 305 are located in proximity of each other. Therefore, the one or more characteristic of media environment 300 measured by user device 305 also applies to media device 106 and display device 301. For example, the same ambient light level by user device 305 also applies to media device 106 and display device 301. By adjusting the brightness and/or the contrast of the content based on measurement data from user device 305, media device 106 can provide a better viewing experience to a user of display device 301. In a non-limiting example, media device 106 can bring up the brightness level of the content (e.g., luminance of video pixels) when user device 305 indicates that media environment 300 is well lit. Or, media device 106 can revert back to or bring down the brightness level of the content (e.g., luminance of video pixels) when user device 305 indicates that media environment 300 is dark.

Media environment 300 may include one or more media systems 104 of FIG. 1. Media environment 300 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content.

Although some examples of this disclosure are discussed with respect to adjusting the brightness and/or the contrast of the content, the embodiments of this disclosure are not limited to these examples and media device 106 can be configured to adjust other parameters of the content. Additionally, or alternatively, media device 106 can be configured to adjust one or more parameters of display device 301 based on the measurement data. In a non-limiting example, media device 106 can be configured to adjust a display mode of display device 301 based on the measurement data.

According to some embodiments, user device 305 can include one or more light sensors 307. Light sensor 307 can include an ambient light sensor configured to measure ambient light of media environment 300. In some examples, light sensor 307 can include one or more photodiodes, phototransistors, photonic integrated circuits, and the like. Light sensor 307 can include any sensor configured to sense and measure the amount of ambient light (e.g., the intensity of light) present in media environment 300.

In some examples, the standard international unit for the illuminance of ambient light is the lux. In a non-limiting example, light sensor 307 can be configured to measure the ambient light from less than 50 lux to over 10,000 lux. For example, light sensor 307 can be configured to measure the ambient light from about 0.01 lux to about 83 klux. Although some examples of this disclosure are discussed with respect to lux, other units of measurement can be used for measuring the illuminance of ambient light at light sensor 307.

Light sensor 307 can be configured to measure the ambient light and generate measurement data based on the measured ambient light. The measurement data can indicate the illuminance of ambient light in media environment 300 measured at light sensor 307. User device 305 can be configured to transmit the measurement data to media device 106. In some embodiments, the measurement data can include values in lux. Additionally, or alternatively, the measurement data can be presented as a value within a plurality of level, where each level can indicate the brightness of ambient light in media environment 300.

According to some embodiments, user device 305 can transmit the measurement data to media device 106 directly and/or through network 303. For example, user device 305 can include one or more transceivers (not shown) to transmit the measurement data to media device 106. One or more transceivers of user device 305 can include processors, controllers, radios, sockets, plugs, buffers, and like circuits/devices used for connecting to and communicating on networks. In some examples, one or more transceivers of user device 305 can include one or more of a cellular subsystem, a WLAN subsystem, a Bluetooth™ subsystem, a near-field communication (NFC), or the like. One or more transceivers of user device 305 can include one or more circuits to enable connection(s) and communication based on, for example, Bluetooth™ protocol (or similar protocols). Additionally, or alternatively, one or more transceivers of user device 305 can include one or more circuits to enable connection(s) and communication over WLAN networks such as, but not limited to, networks based on standards described in IEEE 802.11. For example, one or more transceivers of user device 305 can include one or more circuits to enable communication over mesh networks.

According to some embodiments, network 303 may include wireless (for example, a WLAN such as WiFi) and/or wired connections. Additionally, or alternatively, user device 305 may communicate with media device 106 over Bluetooth™ or other wireless methods. However, the embodiments of this disclosure are not limited to this example, and network 303 can be implemented using other types of wireless and/or wired networks. In various embodiments, network 303 can include, without limitation, mesh, wired and/or wireless intranet, extranet, Internet, cellular, Bluetooth™, infrared, and/or any other short range, long range, local, regional, global communications mechanism, means, approach, protocol and/or network, as well as any combination(s) thereof.

According to some embodiments, media device 106 can receive the measurement data using transceiver 218 from user device 305. Controller 220 can receive the measurement data from transceiver 218. Using the measurement data, controller 220 can adjust one or more parameters of the content that media device 106 provides to display device 301. In some examples, the one or more parameters of the content can include, but are not limited to, brightness, contrast, and the like of the content.

In a non-limiting example, the content can include video data sent from media device 106 to display device 301. According to some embodiments, the video data can include data associated with one or more pixels (e.g., pixel data) of the video sent to display device 301. The pixel data can include a pixel value or a pixel vector. The pixel data can indicate how bright the pixel is and/or the colors of the pixel. Therefore, the pixel data can include a brightness level (or a brightness value) for the pixel. According to some embodiments, the brightness level of the pixel data can include luminance of the pixel. In some examples, the luminance of the pixel can be measured in nits or candela per square meter ($cd/m^2$), which corresponds to the perceived brightness of the pixel by a user. For example, for a grayscale image, the pixel value represents the brightness level. For a color image, each color value (e.g., each value in a pixel vector) represents its corresponding brightness level. An average of the color value can represent the brightness level of the pixel. Alternatively, brightness level can be an additional value (e.g., luminance) in the pixel data.

In a non-limiting example, contrast of the content can be a difference in brightness between different pixels in a frame.

According to some embodiments, controller 220 can adjust one or more parameters of the video data based on the measurement data received from user device 305. For example, controller 220 can adjust the brightness level of the video data (e.g., the pixel data) based on the measurement data received from user device 305 to adjust the brightness and/or the contrast of the content provided to display device 301. For example, controller 220 can correlate a lux level (from the measurement data received from device 305) to the brightness level (of the video data). Media device 106 can send the adjusted content (e.g., the adjusted video data) to display device 301.

According to some embodiments, media device 106 can include (or have access to) a correlation table that correlates the one or more parameters of the content to the ambient light level. For example, the correlation table can correlate the brightness levels of video data to the lux levels of the ambient light. In a non-limiting example, the correlation table can be stored in storage/buffers 208 of FIG. 2. Additionally, or alternatively, the correlation table can be stored in system servers 126 and/or content server(s) 120 of FIG. 1. Although a correlation table is provided as an example, the embodiments of this disclosure can include other methods for correlating the one or more parameters of the content to the ambient light level.

According to some embodiments, after receiving the measurement data from user device 305, controller 220 can compare the measurement data with the corresponding values in the correlation table. Based on the comparison, controller 220 can determine one or more parameters of the content. For example, controller 220 can determine a brightness level based on the received measurement data. If the determined brightness level is different from the brightness level of the content, controller 220 can adjust the brightness level of the content based on the determined brightness level. Controller 220 can then send the adjusted content to display device 301. Therefore, controller 220 can be configured to adjust the video data (e.g., the pixel data) that media device 106 outputs to display device 301 based on the measurement data that media device 106 receives from user device 305.

Although a correlation between brightness level of video data with measured lux levels of the ambient light is discussed above for adjusting the content, the embodiments of this disclosure are not limited to these examples. This disclosure can use other embodiments to adjust the content (e.g., the video data output of media device 106) based on the measurement data that media device 106 receives from user device 305.

In a non-limiting example, user device 305 can include a smart phone having light sensor 307 (e.g., an ambient light sensor). User device 305 can include an application associated with media device 106. The application can be used to, for example, communicate with or control media device 106. In this non-limiting example, the application associated with media device 106 can receive measurement data from light sensor 307 and can transmit the measurement data to media device 106 for adjusting one or more parameters of the content to be displayed on display device 301.

In another non-limiting example, user device 305 can include a remote control (e.g., remote control 110 of FIG. 1). Remote control 110 can include a light sensor configured to measure the ambient light of media environment 300. Remote control 110 can be configured to transmit the measure ambient light (in addition to other measurement data) to media device 106 for adjusting one or more parameters of the content to be displayed on display device 301.

Media device 106 can be coupled to display device 301 using different mechanism. In a non-limiting example, media device 106 can be coupled to display device 301 through high-definition multimedia interface (HDMI) (e.g., any device with HDMI output). In this non-limiting example, media device 301 can adjust its HDMI output based on the measurement data media device 106 receives from user device 305. In a non-limiting example, display device can operate in a high-dynamic-range (HDR). However, the embodiments of this disclosure are not limited to these examples, and can include other mechanisms to couple and other modes of operation at display device 301.

According to some embodiments, media device 106 can be configured to adjust the content that media device 106 outputs once when the content is displayed on display device 301. For example, when a user (e.g., user 132 of FIG. 1) initiates the display of the content using media device 106, the user can initiate the adjustment of the content once at the beginning. In one example, the user can use user device 305 to initiate the adjustment process at media device 106. After receiving the request from user device 305, media device 106 can send a request to user device 305 so that user device 305 can measure one or more characteristics of media environment 300. User device 305 can then transmit the measurement data (the measure one or more characteristics of media environment 300) to media device 106. Media device 106 can use the measurement data to adjust one or more parameters of the content. In some examples, the user can also disable or end the adjustment process using user device 305. For example, using a user interface of user device 305, the user can disable or end the adjustment process. In response, user device 305 can send a request to media device 106 to end the adjustment process.

Additionally, or alternatively, media device 106 can perform the adjustment process discussed above multiple times in response to additional requests from the user. For example, if the conditions in media environment 300 changes, the user can operate user device 305 for further adjustments in the content. After receiving the request from user device 305, media device 106 can send a request to user device 305 so that user device 305 can measure one or more characteristics of media environment 300. User device 305 can then transmit the updated measurement data to media device 106. Media device 106 can use the updated measurement data to adjust one or more parameters of the content.

Additionally, or alternatively, media device 106 can dynamically adjust the content that media device 106 outputs during the time the content is played on display device 301. In some examples, the dynamic adjustment can include periodically requesting the measurement data from user device 305 and adjusting (if needed) the one or more parameters of the content. The periodicity can be defined by a user, a manufacturer, and/or an operator of media device 106.

In some examples, the dynamic adjustment can be based on analysis that media device 106 can perform on the content. For example, media device 106 can monitor and analyze (e.g., periodically) the content to determine whether the content may benefit from the adjustment process. In a non-limiting example, media device 106 can monitor and analyze dark scenes of the content to determine whether the content may benefit from the adjustment process. In some examples, media device 106 can use artificial intelligence (AI) to monitor and analyze the content.

In some examples, the dynamic adjustment can be based on dynamic monitoring and analysis of media environment 300 by user device 305. For example, user device 305 can periodically monitor the characteristics of media environment 300. In a non-limiting example, user device 305 can periodically monitor the ambient light measurements (e.g., ambient light levels) from light sensor 307. If user device 305 determine that changes in the ambient light measurements satisfy a condition (e.g., the changes are more than a threshold), user device 305 can send updated measurement data to media device 106. Media device 106 can determine whether to adjust the one or more parameters of the content based on the received updated measurement data.

Additionally, or alternatively, media device 106 can perform the adjustment processes automatically and without a user's request. For example, media device 106 can process and analyze the content that media device 106 is outputting to display device 301. Based on the analysis, media device 106 can determine to initiate the adjustment process.

According to some embodiments, controller 220 can use data collected using crowdsourcing to adjust one or more parameters of the content that media device 106 outputs to display device 301. For example, thousands or millions of media devices 106 and/or thousands or millions of user devices 305 can be configured to collect measurement data of media environments during display of contents. Media device 106 can access the collected data using for example, system server(s) 126 and/or content server(s) 120. Based on the data accessed by media device 106 and/or measurement data from user device 305, controller 220 can further improve its process to adjust one or more parameters of the content that media device 106 outputs to display device 301.

In a non-limiting example, based on the data collected using crowdsourcing, controller 220 can determine that during specific sections of a specific content, users have requested adjustments to the content. Therefore, controller 220 can request the measurement data from user device 305 during the specific sections of the specific content to adjust one or more parameters of its content.

In another non-limiting example, based on the data collected using crowdsourcing, controller 220 can determine that during specific dates, times, weather conditions, and the like, users have requested adjustments to the content. Therefore, controller 220 can request the measurement data from user device 305 during the specific dates, times, weather conditions, and the like to adjust one or more parameters of its content.

In another non-limiting example, based on the data collected using crowdsourcing, controller 220 can determine that during specific sections of a specific content users have disabled adjustments to the content. Therefore, controller 220 can disable its adjustment process (e.g., does not request the measurement data from user device 305) during the specific sections of the specific content.

In another non-limiting example, based on the data collected using crowdsourcing, controller 220 can determine that during specific sections of a specific content users have made additional or different adjustments to the content. Therefore, controller 220 can make similar adjustments during the specific sections of the specific content.

This disclosure is not limited to these examples, and can include other embodiments of using crowdsourcing for adjusting one or more parameters of the content to be displayed on display device 301.

The measurement data generated by user device 305 and transmitted to media device 106 can include different or additional data to ambient light measurements (e.g., ambient light levels) from light sensor 307.

In some examples, the measurement data can also include characteristics (e.g., settings) of user device 305. Controller 220 can use the characteristics of user device 305 to determine whether to perform the adjustment of one or more parameters of the content. Additionally, or alternatively, controller 220 can use the characteristics of user device 305 to adjust one or more parameters of the content. In a non-limiting example, the characteristics of user device 305 can include the brightness level of a display device of user device 305 set by the user of user device 305. User device 305 can send the brightness level of its display device to media device 106. Controller 220 can use the brightness level of the display device of user device 305 to adjust of one or more parameters of the content (and/or to determine whether or not to adjust). In some examples, user device 305 can send the brightness level of its display device to media device 106 in response to a request from media device 106. In another non-limiting example, the characteristics of user device 305 can include information on whether the user of user device 305 uses a light mode (e.g., night mode, day mode, and the like) for a display device of user device 305. User device 305 can send the light mode of its display device to media device 106. Controller 220 can use the light mode of the display device of user device 305 to adjust of one or more parameters of the content (and/or to determine whether or not to adjust). In some examples, user device 305 can send the light mode of its display device to media device 106 in response to a request from media device 106.

In some examples, the measurement data can also include physical characteristics (e.g., location information) of user device 305. Controller 220 can use the physical characteristics of user device 305 to determine whether to perform the adjustment of one or more parameters of the content. Additionally, or alternatively, controller 220 can use the physical characteristics of user device 305 to adjust one or more parameters of the content. For example, if the user device 305 determines (e.g., detects) that user device 305 has been moved away from media environment 300, user device 305 can send a signal (e.g., as part of the measurement data) to media device 106 to ignore (e.g., do not use) any other measurement data from user device 305 until further notification from user device 305. Additionally, or alternatively, if the user device 305 determines (e.g., detects) that user device 305 has been moved away from media environment 300, user device 305 can halt sending measurement data to media device 106. In a non-limiting example, the physical characteristics (e.g., location information) of user device 305 can indicate that user device 305 has been moved to another part of media environment 300 that has different characteristics than media environment 300. In a non-limiting example, the physical characteristics (e.g., location information) of user device 305 can indicate that user device 305 has been moved inside a close container. In a non-limiting example, the physical characteristics (e.g., location information) of user device 305 can indicate that user device 305 has been moved to, for example, the user's face for a phone call.

In some examples, the measurement data can also include other data from user device 305. The additional data can include weather information, geographical location, time of day information, date information, sunrise/sunset time information, and the like. Controller 220 can use the additional data from user device 305 to determine whether to perform the adjustment of one or more parameters of the content. Additionally, or alternatively, controller 220 can use the additional data from user device 305 to adjust one or more parameters of the content.

As a non-limiting example, user device 305 can determine location(s) of one or more windows close to display device 301. For example, user device 305 can determine its location within media environment 300 and use a plan of media environment 300 to determine the location(s) of the one or more windows close to display device 301. In one example, user device 305 compare the location(s) of the one or more windows to one or more thresholds to determine the location (s) of the one or more windows that are close to display device 301. Based on determining the location(s), user device 305 can determine whether any of the windows are facing east or west. User device 305 can transmit the information associated with the windows (e.g., their location, whether they are facing east or west, etc.) with information regarding sunrise and/or sunset to media device 106 as part of the measurement data. Controller 220 can use the additional data from user device 305 to adjust one or more parameters of the content. For example, controller 220 can gradually adjust the brightness level (e.g., the luminance) of the video data in anticipation of the sunrise or sunset. For example, controller 220 can gradually increase the brightness level (e.g., the luminance) of the video data if windows in media environment 300 are facing east and sunrise is occurring (and/or windows are facing west and sunset is occurring).

As another non-limiting example, measurement data from user device 305 can include weather information indicating an increase in clouds during the day. Controller 220 can use the weather information from user device 305 to adjust one or more parameters of the content. For example, controller 220 can gradually adjust the brightness level (e.g., the luminance) of the video data in anticipation of the cloudy day. In another example, the weather information can indicate increase in clouds for a first period of time and then decrease in cloudiness for a second period of time. Controller 220 can gradually adjust the brightness level (e.g., the luminance) of the video data in anticipation of the changes of the brightness of media environment 300 based on the changes in the amount of sunshine.

As another non-limiting example, measurement data from user device 305 can include geographical location of user device 305, information associated with the time of day, and information associated with the date. Depending on this information, controller 220 can determine the brightness of media environment 300. Accordingly, controller 220 can adjust one or more parameters of the content. For example, controller 220 can adjust the brightness level (e.g., the luminance) of the video data based on geographical location of user device 305, information associated with the time of day, and information associated with the date.

According to some embodiments, controller 220 can receive a plurality of measurement data from a plurality of user devices 305. In a non-limiting example, the plurality of user device 305 can include a plurality of IoT devices (in addition to or instead of a smart phone). Controller 220 can use the plurality of measurement data from the plurality of user devices 305 to determine whether to perform the adjustment of one or more parameters of the content. Additionally, or alternatively, controller 220 can use the plurality of measurement data from the plurality of user devices 305 to adjust one or more parameters of the content.

As some non-limiting examples, the IoT devices can include smart appliances such as, but no limited to, smart TVs, smart refrigerators, smart washers, smart dryers, smart dishwashers, smart ovens and gas tops, smart microwaves, smart heating, ventilation, and air conditionings (HVACs), smart fans, smart blinds, or the like. As other non-limiting examples, the IoT devices can include smart home security systems, smart locks, smart fire alarms/systems, or the like. The IoT devices can include sensors used in homes, offices, factories, medical sensors, fitness sensors/trackers, or the like. It is noted that although some embodiments of this disclosure are discussed with respect to some exemplary IoT devices, the embodiments of this disclosure are not limited to these examples and can be applied to other IoT devices.

According to some embodiments, the measurement data can also include an indication signal from user device 305 indicating whether to perform the adjustment of one or more parameters of the content. In a non-limiting example, the user of user device 305 can activate a process in user device 305 to initiate the adjustment of one or more parameters of the content. For example, the user can use a user interface of user device 305 to request media device 106 to perform the adjustment of one or more parameters of the content. Additionally, or alternatively, the user can use a slider on the user interface of user device 305 to request media device 106 to perform the adjustment of one or more parameters of the content and to request by how much to adjust the one or more parameters. In another example, the user can use a voice command with user device 305 to request media device 106 to perform the adjustment of one or more parameters of the content.

Figure 4:
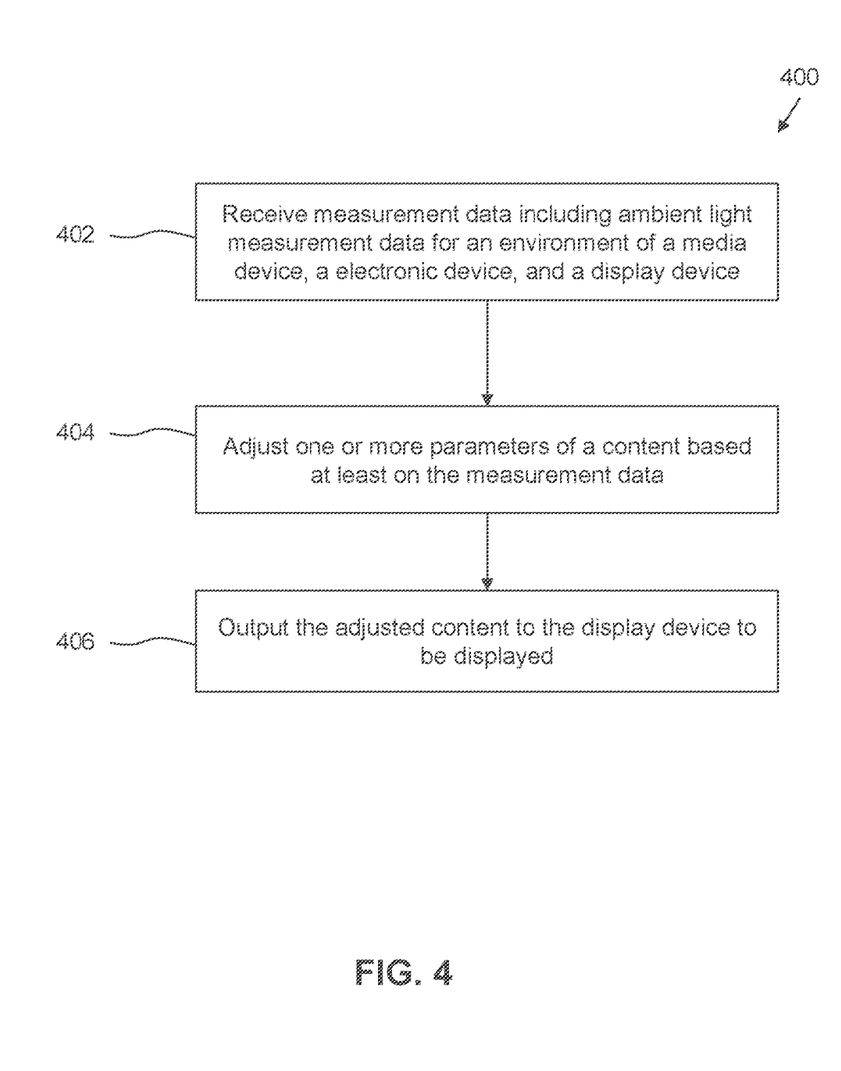
FIG. 4 illustrates an example method for adjusting an output of a media device to a display device based on measurement data from a user device, according to some embodiments.

FIG. 4 illustrates an example method 400 for adjusting an output of a media device to a display device based on measurement data from a user device, according to some embodiments. As a convenience and not a limitation, FIG. 4 may be described with regard to elements of FIGS. 1-3. Method 400 may represent the operation of a media device (e.g., media device 106 of FIGS. 1-3) for adjusting one or more parameters of a content to be displayed on a display device. Method 400 may also be performed by computer system 600 of FIG. 6. But method 400 is not limited to the specific aspects depicted in those figures and other systems may be used to perform the method as will be understood by those skilled in the art. It is to be appreciated that not all operations may be needed, and the operations may not be performed in the same order as shown in FIG. 4.

At 402, measurement data is received from an electronic device. For example, media device 106 can receive the measurement data from an electronic device such as, but not limited to, user device 305 of FIG. 3. According to some embodiments, the measurement data can include ambient light measurement data for an environment (e.g., media environment 300) of the media device, the electronic device, and a display device (e.g., display device 301 of FIG. 3). The measurement data can include data generated by one or more sensors of the electronic device such as, but not limited to, user device 305 of FIG. 3.

As discussed above, the measurement data generated by the electronic device (e.g., user device 305) and transmitted to media device 106 can include different or additional data to ambient light measurement data (e.g., ambient light levels) from light sensor 307. In some examples, the measurement data can also include characteristics (e.g., settings) of the electronic device (e.g., user device 305). In some examples, the measurement data can also include physical characteristics (e.g., location information) of the electronic device (e.g., user device 305). In some examples, the measurement data can also include other data such as, but not limited to, weather information, geographical location, time of day information, date information, sunrise/sunset time information, and the like. In some examples, the measurement data can also include one or more characteristics of the environment (e.g., media environment 300) of the media device, the electronic device, and the display device.

At 404, one or more parameters of a content is adjusted based at least on the measurement data. For example, media device 106 adjusts one or more parameters of the content that media device 106 outputs to display device 301 of FIG. 3. Media device 106 adjusts the one or more parameters of the content based at least on the measurement data that media device 106 receives from, for example, user device 305. According to some embodiments, the content can include video data and the one or more parameters of the content can include a brightness level (and/or a contrast level) associated with the video data.

According to some embodiments, and before adjusting the one or more parameters of the content, media device 106 can determine whether the one or more parameters of the content are to be adjusted or not. In one example, media device 106 can receive a request from, for example, user device 305 to adjust the one or more parameters of the content. Additionally, or alternatively, media device 106 can periodically monitor, process, and analyze the content it receives, and can determine, based on the analysis, whether the one or more parameters of the content are to be adjusted. In some embodiments, if media device 106 determines that the one or more parameters of the content are to be adjusted, media device 106 can transmit a request for the measurement data to the electronic device (e.g., user device 305). An exemplary method for adjusting the one or more parameters of the content is discussed in more detail below with respect to FIG. 5.

At 406, the adjusted content is output to the display device to be displayed. For example, after adjusting the one or more parameters of the content, media device 106 can output the adjusted content to display device 301. Display device 301 can display the adjusted content. According to some embodiments, the adjusted content can include video data with adjusted brightness level (and/or adjusted contrast level). Therefore, in some examples and in alternative to adjusting a backlight of display device 301, media device 106 can adjust the brightness level (and/or the contrast level) of the video data that is being input to display device 301 based on measurement data provided by user device 305.

According to some embodiments, method 400 can move back to operation 402 to continue receiving measurement data and adjusting the content, if needed.

Figure 5:
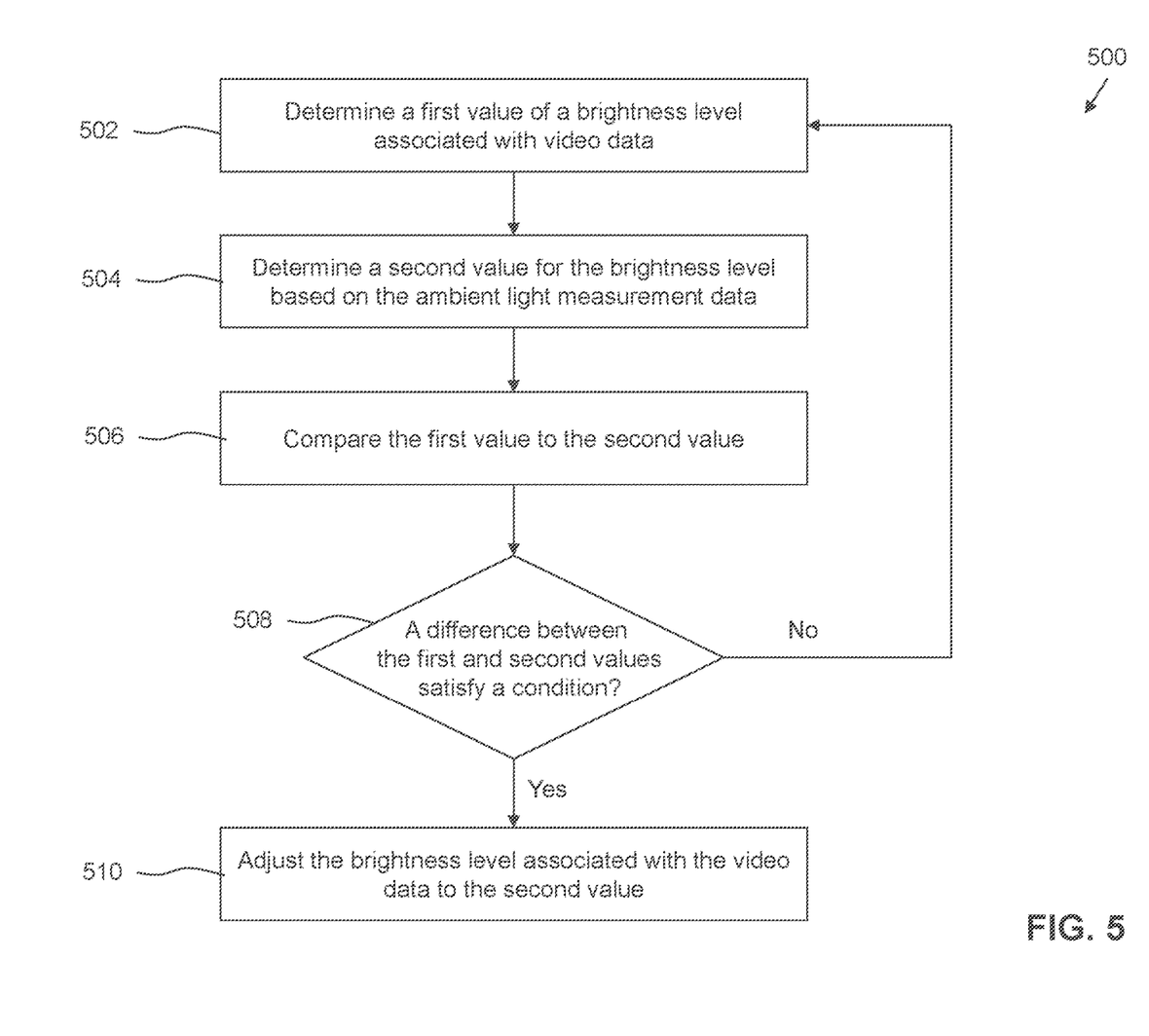
FIG. 5 illustrates an example method for adjusting a brightness level of an output of a media device to a display device based on ambient light measurement data from a user device, according to some embodiments.

FIG. 5 illustrates an example method 500 for adjusting a brightness level of an output of a media device to a display device based on ambient light measurement data from a user device, according to some embodiments. As a convenience and not a limitation, FIG. 5 may be described with regard to elements of FIGS. 1-5. Method 500 may represent the operation of a media device (e.g., media device 106 of FIGS. 1-3) for adjusting one or more parameters (e.g., a brightness level) of a content to be displayed on a display device. Method 500 may also be performed by computer system 600 of FIG. 6. But method 500 is not limited to the specific aspects depicted in those figures and other systems may be used to perform the method as will be understood by those skilled in the art. It is to be appreciated that not all operations may be needed, and the operations may not be performed in the same order as shown in FIG. 5.

According to some embodiments, method 500 can be part of operation 404 of FIG. 4. For example, media device 106 can receive the measurement data from user device 305. Depending the measurement data and/or an analysis of the content that media device 106 receives, media device 106 can determine whether to adjust one or more parameters of the content. As one exemplary embodiment, the content can include video data to be displayed on display device 301. Although method 500 (and some examples of this disclosure) are discussed with respect to video data, the content in the embodiments of this disclosure can include other data.

At 502, a first value of the brightness level associated with the video data in the content is determined. For example, media device 106 can monitor, process, and analyze the content (that includes the video data) that media device 106 receives. As part of the analysis, media device 106 can determine the first value of the brightness level of the video data. This first value of the brightness level indicates the brightness level of the video data that media device 106 receives from, for example, a content provider (e.g., content servers 120). As discussed above, the brightness level can include luminance of one or more video pixels, according to some embodiments. In this example, media device 106 can determine the first value of the luminance of the video data.

In addition to, or alternative to, media device 106 determining the first value of the brightness level (e.g., the luminance) of the video data by processing and analyzing the content, media device 106 can access system server(s) 126 and/or content server(s) 120 to read the first value of the brightness level (e.g., the luminance) of the video data, according to some embodiments. In this example, system server(s) 126 and/or content server(s) 120 can store the value (e.g., the first value) of the brightness level (e.g., the luminance) of the video data. Media device 106 can access system server(s) 126 and/or content server(s) 120 to read this value instead of processing and analyzing the content. In a non-limiting example, system server(s) 126 and/or content server(s) 120 can store the value (e.g., the first value) of the brightness level in a table that maps video content (or video content frame number) to brightness level. In some examples, the table can include one brightness level for a content. In some examples, the table can include a plurality of brightness levels for the content (e.g., one brightness level corresponding to each video content frame number).

At 504, a second value for the brightness level is determined based on the ambient light measurement data. As discussed above, media device 106 can receive the measurement data at 401 of method 400 from user device 305. The measurement data can include ambient light measurement data. Based on the ambient light measurement data, media device 106 can determine the second value for the brightness level. As discussed above, the brightness level can include luminance of one or more video pixels, according to some embodiments. In this example, media device 106 can determine the second value of the luminance based on the ambient light measurement data.

According to some embodiments, the second value for the brightness level is stored in a table indicating correlations between values of the brightness level and values of the ambient light measurement data. For example, media device 106 can include (or have access to) a correlation table that correlates the one or more parameters of the content to the ambient light level. For example, the correlation table can correlate the brightness levels of video data to the lux levels of the ambient light. Although a correlation table is provided as an example, the embodiments of this disclosure can include other methods for correlating the one or more parameters of the content to the ambient light level. According to some embodiments, after receiving the ambient light measurement data, media device 106 can look up the correlation table to determine the second value for the brightness level based on the ambient light measurement data (e.g., the lux levels of the ambient light).

At 506, the first value of the brightness level (e.g., the luminance) is compared to the second value of the brightness level (e.g., the luminance). For example, media device 106 can compare the first and second values of the brightness level to determine whether the brightness level of the content (e.g., the video data) is to be adjusted before the content is output to display device 301.

At 508, it is determined whether a difference between the first and second values of the brightness level (e.g., the luminance) satisfy a condition. For example, media device 106 can determine whether the difference between an actual brightness level of the video data and a desired brightness level of the video data (determined based on the ambient light measurement data) satisfy a condition. In some examples, the condition can include threshold. In these examples, if the difference between the first and second values of the brightness level is less than the threshold, the condition is not satisfied. However, if the difference between the first and second values of the brightness level is greater than the threshold, the condition is satisfied. It is noted that the embodiments of this disclosure can include other conditions.

If the condition is satisfied, method 500 moves to 510. At 510, the brightness level (e.g., the luminance) associated with the video data is adjusted to the second value. For example, media device 106 can adjust the one or more parameters of the content by setting the brightness level (e.g., the luminance) associated with the video data to the second value that was determined in 504 based on the ambient light measurement data. According to some embodiments, method 500 can move back to operation 502 to continue receiving measurement data and adjusting the content, if needed.

If the condition is not satisfied, method 500 moves to 502 to continue receiving measurement data and adjusting the content, if needed. In this example, media device 106 has determined that the brightness level associated with the video data is not to be adjusted.

Example Computer System

Figure 6:
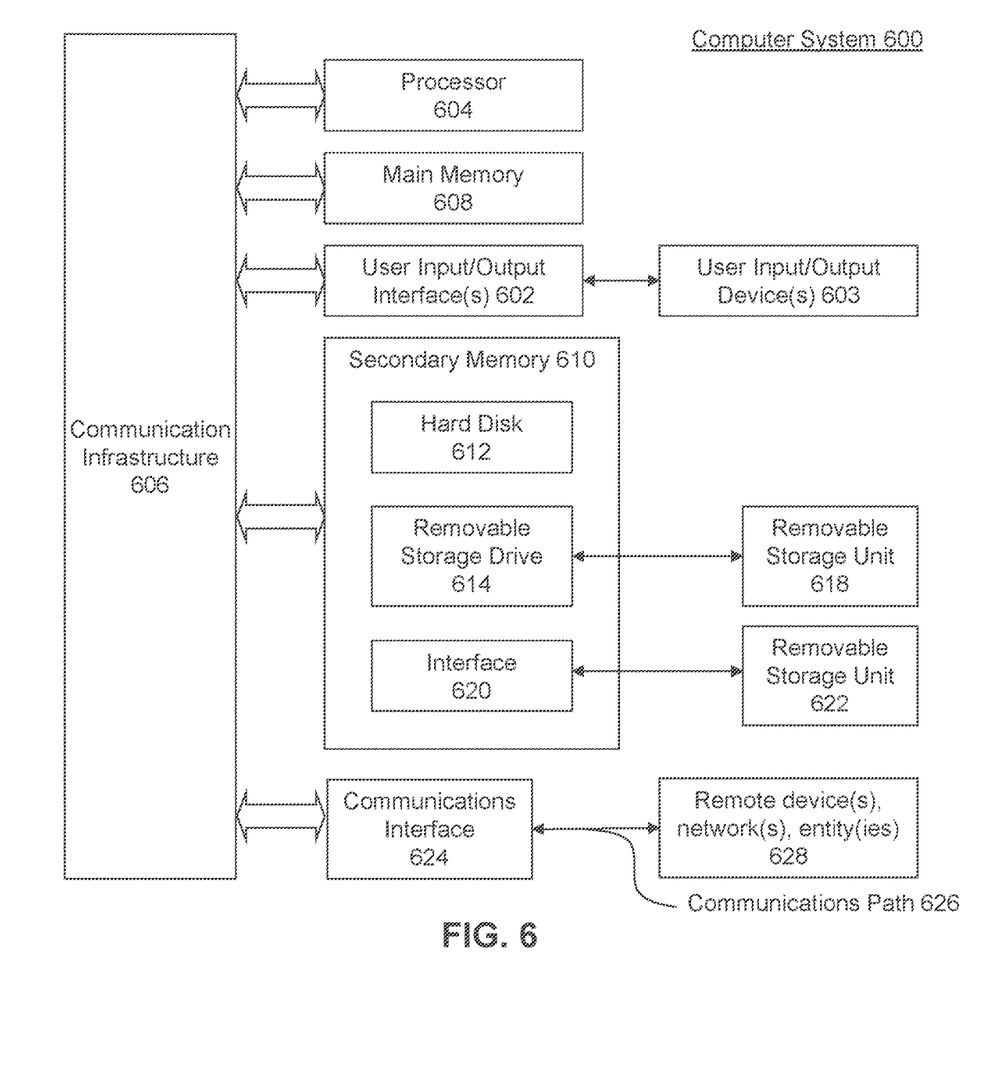
FIG. 6 illustrates an example computer system useful for implementing various embodiments.

Various embodiments may be implemented, for example, using one or more well-known computer systems, such as computer system 600 shown in FIG. 6. For example, the media device 106 may be implemented using combinations or sub-combinations of computer system 600. Also or alternatively, one or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600 or processor(s) 604), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method for adjusting one or more parameters of a content to be displayed on a display device, the computer implemented method comprising:
   determining, by a media device, that the one or more parameters of the content are to be adjusted;
   in response to the determination that the one or more parameters of the content are to be adjusted, transmitting, by the media device to an electronic device, a request for measurement data;
   receiving, by the media device and from the electronic device, the measurement data comprising ambient light measurement data for an environment of the media device, the electronic device, and the display device;
   adjusting, at the media device, the one or more parameters of the content based at least on the measurement data; and
   outputting, by the media device, the adjusted content to the display device to be displayed.

2. The computer implemented method of claim 1, wherein the content comprises video data and the one or more parameters of the content comprise a luminance associated with the video data.

3. The computer implemented method of claim 2, wherein the adjusting comprises:
   determining a first value of the luminance;
   determining, at the media device, a second value for the luminance based on the ambient light measurement data;
   comparing, at the media device, the first value to the second value; and
   in response to a difference between the first value and the second value satisfying a condition, adjusting, at the media device, the luminance to the second value.

4. The computer implemented method of claim 3, wherein the second value is stored in a table indicating correlations between values of the luminance and values of the ambient light measurement data.

5. The computer implemented method of claim 1, wherein the measurement data further comprises weather information and the computer implemented method further comprises:
   gradually adjusting the one or more parameters of the content based on the measurement data.

6. The computer implemented method of claim 1, wherein the determining that the one or more parameters of the content are to be adjusted comprises:
   periodically analyzing, at the media device, the content received at the media device, or
   receiving, at the media device and from the electronic device, a second request to adjust the one or more parameters of the content.

7. The computer implemented method of claim 1, wherein the measurement data further comprises one or more characteristics of the electronic device.

8. The computer implemented method of claim 1, wherein the measurement data further comprises one or more characteristics of the environment of the media device, the electronic device, and the display device.

9. A non-transitory computer-readable medium of a media device having instructions stored thereon that, when executed by at least one computing device, cause the at least one computing device to perform operations for adjusting one or more parameters of a content to be displayed on a display device, the operations comprising:
   determining that the one or more parameters of the content are to be adjusted;
   in response to the determination that the one or more parameters of the content are to be adjusted, transmitting, to an electronic device, a request for measurement data;
   receiving, from the electronic device, the measurement data comprising ambient light measurement data for an environment of the media device, the electronic device, and the display device;
   adjusting the one or more parameters of the content based at least on the measurement data; and
   outputting the adjusted content to the display device to be displayed.

10. The non-transitory computer-readable medium of claim 9, wherein the content comprises video data and the one or more parameters of the content comprise a luminance associated with the video data.

11. The non-transitory computer-readable medium of claim 10, wherein for adjusting the one or more parameters of the content, the operations comprise:
    determining a first, value of the luminance;
    determining a second value for the luminance based on the ambient light measurement data;
    comparing the first value to the second value; and
    in response to a difference between the first value and the second value satisfying a condition, adjusting the luminance to the second value.

12. The non-transitory computer-readable medium of claim 11, wherein the second value is stored in a table indicating correlations between values of the luminance and values of the ambient light measurement data.

13. The non-transitory computer-readable medium of claim 9, wherein for determining that the one or more parameters of the content are to be adjusted, the operations comprise:
    periodically analyzing, at the media device, the content received at the media device, or
    receiving, at the media device and from the electronic device, a second request to adjust the one or more parameters of the content.

14. The non-transitory computer-readable medium of claim 9, wherein the measurement data further comprises one or more characteristics of the electronic device.

15. The non-transitory computer-readable medium of claim 9, wherein the measurement data further comprises one or more characteristics of the environment of the media device, the electronic device, and the display device.

16. A media device, comprising:
    a transceiver configured to communicate over a wireless network; and
    a controller coupled to the transceiver and configured to:
        determine that one or more parameters of a content are to be adjusted;

in response to the determination that the one or more parameters of the content are to be adjusted, transmit a request for measurement data to an electronic device;

receive, using the transceiver and from the electronic device, measurement data comprising ambient light measurement data for an environment of the media device, the electronic device, and a display device;

adjust the one or more parameters of the content based at least on the measurement data, wherein the content comprises video data and the one or more parameters of the content comprise a luminance associated with the video data; and output the adjusted content to the display device to be displayed.

17. The media device of claim 16, wherein the controller is further configured to:
determine a first value of the luminance;
determine a second value for the luminance based on the ambient light measurement data;
compare the first value to the second value; and
in response to a difference between the first value and the second value satisfying a condition, adjust the luminance to the second value.

18. The media device of claim 17, wherein the second value is stored in a table indicating correlations between values of the luminance and values of the ambient light measurement data.

19. The media device of claim 18, wherein to determine that the one or more parameters of the content are to be adjusted, the controller is further configured to:
periodically analyze the content received at the media device, or
receive, from the electronic device, a second request to adjust the one or more parameters of the content.

20. The media device of claim 16, wherein the measurement data further comprises at least one of a plan of the environment of the media device, the electronic device, and the display device and a geographical location of the environment and wherein the controller is further configured to:
gradually adjust the one or more parameters of the content based on the measurement data.

* * * * *